US007944991B2

(12) United States Patent
Zhao et al.

(10) Patent No.: US 7,944,991 B2
(45) Date of Patent: May 17, 2011

(54) CONSTRAINED CLIPPING FOR PEAK-TO-AVERAGE POWER RATIO (CREST FACTOR) REDUCTION IN MULTICARRIER TRANSMISSION SYSTEMS

(75) Inventors: Chunming Zhao, Atlanta, GA (US); Robert J. Baxley, Atlanta, GA (US); Guotong Zhou, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1146 days.

(21) Appl. No.: 11/588,009

(22) Filed: Dec. 11, 2006

(65) Prior Publication Data

US 2008/0019453 A1 Jan. 24, 2008

Related U.S. Application Data

(60) Provisional application No. 60/730,742, filed on Oct. 27, 2005.

(51) Int. Cl.
*H04K 1/02* (2006.01)

(52) U.S. Cl. ........ 375/296; 375/260; 375/267; 375/295; 375/297

(58) Field of Classification Search ............... 375/260, 375/295–297, 267; 370/206–210; 327/309–310
See application file for complete search history.

(56) References Cited

U.S. PATENT DOCUMENTS

| | | | |
|---|---|---|---|
| 5,610,908 A * | 3/1997 | Shelswell et al. | 370/210 |
| 7,292,639 B1 * | 11/2007 | Demirekler et al. | 375/260 |
| 7,313,373 B1 * | 12/2007 | Laskharian et al. | 455/127.1 |
| 7,321,629 B2 * | 1/2008 | Feng et al. | 375/260 |
| 7,593,699 B2 * | 9/2009 | Duperray | 455/114.2 |
| 7,599,332 B2 * | 10/2009 | Zelst et al. | 370/334 |
| 2004/0240574 A1 * | 12/2004 | Piirainen et al. | 375/260 |
| 2005/0129140 A1 * | 6/2005 | Robinson | 375/297 |
| 2005/0259565 A1 * | 11/2005 | Fujii et al. | 370/203 |

OTHER PUBLICATIONS

"IEEE Standard for Local and Metropolitan Area Networks Part 16: Air Interface for Fixed Broadband Wireless Access Systems,".
IEEE Std. 802.16-2004 (Revision of IEEE Std. 802.16/2001), pp. 1-857, 2004.
Bauml, et al., "Reducing the peak-to-average power ratio of multicarrier modulation by selected mapping," IEE Electronics Letters, vol. 32, No. 22, pp. 2056-2057, Oct. 1996.
"Radio transmission and reception," GSM Recommendation 05.05, Dec. 1999.

(Continued)

*Primary Examiner* — Chieh M Fan
*Assistant Examiner* — Sophia Vlahos
(74) *Attorney, Agent, or Firm* — Ryan A. Schneider, Esq.; Troutman Sanders LLP (57) ABSTRACT

Disclosed is a constrained clipping technique for reducing the peak-to-average power ratio (PAR) or crest factor of a multicarrier communications signal. This is a transmitter-side processing technique that does not impose any modification at the receiver. Constrained clipping achieves PAR reduction while simultaneously satisfying spectral mask and error vector magnitude (EVM) constraints that are specified by most modern communications standards. The constrained clipping technique includes two independent processing units, one to satisfy an in-band EVM constraint and the other to satisfy an out-of-band spectral constraint. Achievable PAR reduction results vary depending on a particular standard's requirements, but by using constrained clipping on a QPSK WiMax signal with 256 subcarriers, for example, a 4.5 dB PAR reduction at the $10^{-2}$ complementary cumulative distribution function (CCDF) level can be obtained.

10 Claims, 4 Drawing Sheets

OTHER PUBLICATIONS

Jiang et al., "Exponential companding technique for PAPR reduction in OFDM systems," IEEE Trans. on Broadcasting, vol. 51, No. 2, pp. 244-248, Jun. 2005.

X. Wang et al., "Reduction of peak-to-average power ratio of OFDM system using a companding technique," IEEE Trans. on Broadcasting, vol. 45, pp. 303-307, Sep. 1999.

"Base station (BS) conformance testing (FDD)," 3GPP TS 25.141, v3.14.0, pp. 1-109, May 2005.

Suraweera, et al., "OFDM peak-to-average power reduction scheme with spectral masking," Proc. Symp on Comm Systems, Networks and Digital Signal Processing, pp. 164-167,Jul. 4.

S. Muller et al. "OFDM with reduced peak-to-average power ratio by optimum combination of partial transmit sequences," IEE Electronics Letters, vol. 33, pp. 368-369, Feb. 1997.

H. L. Maattanen, et al, "Nonlinear amplification of clipped-filtered multicarrier signals," IEEE VTS 61st Vehicular Technology Conference, Spring 2005.

R. J. Baxley and G. T. Zhou, "MAP metric for blind phase sequence detection in selected mapping," IEEE Trans. on Broadcasting, vol. 51, No. 4, pp. 565-570, Dec. 2005.

J. Tellado, Multicarrier Modulation with Low PAR: Applications to DSL and Wireless, Kluwer Academic Publishers, 2000.

B. S. Krongold and D. L. Jones, "PAR reduction in OFDM via active constellation extension," IEEETrans. On Broadcasting, vol. 49, No. 3, pp. 258-268, Sep. 2003.

S.-K. Deng and M.-C. Lin, "OFDM PAPR reduction using clipping with distortion control," Proc. IEEE Intl. Conf. Communications, pp. 2563-2567, May 2005.

J. Armstrong, "New OFDM peak-to-average power reduction scheme," Proc. IEEE VTS 53rd Vehicular Technology Conference. vol. 1, pp. 756-760, May 2001.

J. Armstrong, "Peak-to-average power reduction for OFDM by repeated clipping and frequency domain filtering," IEE Electronics Letters, vol. 38, issue 5, pp. 246-247, Feb. 2002.

X. Li and L. J. Cimini, "Effects of clipping and filtering on the performance of OFDM," Proc. VTC'97, pp. 1634-1638, May 1997.

M. Sharif and B. H. Khalaj, "Peak to mean envelope power ratio of over-sampled OFDM signals: an analytical approach,", IEEE International Conference on Communications, vol. 5, pp. 1476-1480, Jun. 2001.

* cited by examiner

CONSTRAINED CLIPPING FOR PEAK-TO-AVERAGE POWER RATIO (CREST FACTOR) REDUCTION IN MULTICARRIER TRANSMISSION SYSTEMS

RELATED U.S. APPLICATION DATA

Provisional application No. 60/730,742 filed on Oct. 27, 2005.

STATEMENT REGARDING FEDERALLY SPONSORED RESEARCH OR DEVELOPMENT

This invention was made with support from the U.S. Army Research Laboratory under contract No. DAAD19-01-2-0011. The U.S. Government may have a paid-up license in this invention and the right in limited circumstances to require the patent owner to license to others on reasonable terms as provided for by the terms of the Agreement.

BACKGROUND

The present invention relates to RF transmission systems and methods, and more particularly, to apparatus, algorithms, techniques and methods that implement constrained clipping for peak-to-average power ratio (or crest factor) reduction in multicarrier (MC) systems. Multicarrier signals are a popular choice in modern communications systems. Several specific multicarrier communications signals include orthogonal frequency division multiplexing (OFDM), orthogonal frequency division multiple access (OFDMA), multicarrier code division multiple access (MC-CDMA) and discrete multitone (DMT).

Despite their popularity, multicarrier signals have the drawback of large peak-to-average power ratios (PARs) or equivalently, crest factors. There have been a number of proposals to solve this problem, many of which require receiver-side modifications that may be difficult to deploy in existing communications systems. Such approaches include selected mapping, discussed by R. W. Bauml, R. F. H. Fischer and J. B. Huber, "Reducing the peak-to-average power ratio of multicarrier modulation by selected mapping," IEE Electronics Letters, vol. 32, no. 22, pp. 2056-2057, October 1996, and R. J. Baxley and G. T. Zhou, "MAP metric for blind phase sequence detection in selected mapping," IEEE Trans. on Broadcasting, vol. 51, no. 4, pp. 565-570, December 2005, companding discussed by X. Wang, T. Tjhung, and C. Ng, "Reduction of peak-to-average power ratio of OFDM system using a companding technique," IEEE Trans. on Broadcasting, vol. 45, pp. 303-307, September 1999, partial transmit sequence discussed by S. Muller and J. Huber, "OFDM with reduced peak-to-average power ratio by optimum combination of partial transmit sequences," IEE Electronics Letters, vol. 33, pp. 368-369, February 1997, tone injection, tone reservation, or coding as discussed in J. Tellado, *Multicarrier Modulation with Low PAR: Applications to DSL and Wireless*, Kluwer Academic Publishers, 2000 and references therein. Additionally, there have been several methods proposed that do not require receiver-side modification such as clipping-based methods, active constellation extension (ACE) discussed by B. S. Krongold and D. L. Jones, "PAR reduction in OFDM via active constellation extension," IEEE Trans. on Broadcasting, vol. 49, no. 3, pp. 258-268, September 2003, and an ACE-like method proposed by S.-K. Deng and M.-C. Lin, "OFDM PAPR reduction using clipping with distortion control," Proc. IEEE Intl. Conf. Communications, pp. 2563-2567, May 2005.

Orthogonal frequency division multiplexing (OFDM) is a particularly popular multicarrier transmission method in high-speed communications schemes. For example, the IEEE 802.11 wireless standard has an OFDM option and WiMax (IEEE 802.16) also uses OFDM or OFDMA. The IEEE 802.16 wireless standard is described in "IEEE Standard for Local and Metropolitan Area Networks Part 16: Air Interface for Fixed Broadband Wireless Access Systems," IEEE Std. 802.16-2004 (Revision of IEEE Std. 802.16-2001), pp. 1-857, 2004. Additionally, OFDM has been adopted by digital audio broadcasting (DAB), digital video broadcasting (DVB) and high performance radio metropolitan area network (HIPER-MAN). To illustrate the current algorithm, its implementation is demonstrated in an OFDM system. However, the algorithm is readily adaptable to any multicarrier communications system.

Overview of Clipping Techniques

Let $\{X_k\}_{k=-N/2}^{N/2-1}$ be the frequency domain sequence of an OFDM symbol where N is the number of subcarriers. Since Nyquist rate samples might not represent the peaks of the continuous-time signal, it is desirable to show CFR performance on over-sampled discrete-time signals. This is discussed by J. Armstrong, "New OFDM peak-to-average power reduction scheme," Proc. IEEE VTS 53rd Vehicular Technology Conference. vol. 1, pp. 756-760, May 2001, J. Armstrong, "Peak-to-average power reduction for OFDM by repeated clipping and frequency domain filtering," IEE Electronics Letters, vol. 38, issue 5, pp. 246-247, February 2002, X. Li and L. J. Cimini, "Effects of clipping and filtering on the performance of OFDM," Proc. VTC'97, pp. 1634-1638, May 1997, H. L. Maattanen, N. Y. Ermolova and S. G. Haggman, "Nonlinear amplification of clipped-filtered multicarrier signals," IEEE VTS 61st Vehicular Technology Conference, vol. 2, pp. 958-962, May 2005, for example. It is typical to use an over-sampling factor of $L \geq 4$ so that the PAR before the digital to analog (D/A) conversion can accurately describe the PAR after the D/A conversion, such as is discussed by M. Sharif and B. H. Khalaj, "Peak to mean envelope power ratio of over-sampled OFDM signals: an analytical approach," IEEE International Conference on Communications, vol. 5, pp. 1476-1480, June 2001, for example. For CFR methods with distortion, over-sampling is also necessary to examine the out-of-band spectral characteristics of the signal after CFR.

Define the out-of-band indices to be the set O: $[-LN/2, -N/2-1] \cup [N/2, LN/2-1]$ and the in-band indices to be the set I: $[-N/2, N/2-1]$. Denote the zero-padded version of $X_k$ by $\{X_k^{(L)}\}_{k=-LN/2}^{LN/2-1}$ where $$X_k^{(L)} = \begin{cases} X_k, & k \in I, \\ 0, & k \in O. \end{cases} \tag{1}$$

The over-sampled discrete-time symbol $x_n^{(L)}$ can be calculated as follows:

$$x_n^{(L)} = \frac{1}{\sqrt{LN}} \sum_{k=-LN/2}^{LN/2-1} X_k^{(L)} e^{j\frac{2\pi k n}{LN}}, \; 0 \leq n \leq LN - 1. \tag{2}$$

Clipping is the simplest CFR method. Polar clipping $x_n^{(L)}$ with threshold $A_{max}$ yields $$\bar{x}_n^{(L)} = \begin{cases} x_n^{(L)}, & |x_n^{(L)}| \leq A_{max}, \\ A_{max} e^{j \angle x_n^{(L)}}, & |x_n^{(L)}| > A_{max}. \end{cases} \tag{3}$$

The corresponding frequency domain signal is $$\overline{X}_k^{(L)} = \frac{1}{\sqrt{LN}} \sum_{n=0}^{LN-1} \overline{x}_n^{(L)} e^{-j\frac{2\pi k n}{LN}}, \quad -\frac{LN}{2} \leq k \leq \frac{LN}{2} - 1. \quad (4)$$

The clipping operation in equation (3) generates distortions in $\overline{X}_k^{(L)}$ both in-band and out-of-band. In-band distortion is observed when $\overline{X}_k^{(L)} \neq X_k$ for $k \in I$. Out-of-band spectral regrowth is revealed since $\overline{X}_k^{(L)} \neq 0$ for $k \in O$. These are in contrast to the unclipped signal $X_k^{(L)}$ described in equation (1).

Denote by $$E_k = \overline{X}_k^{(L)} - X_k^{(L)}, \quad k \in I \quad (5)$$
$$= \overline{X}_k^{(L)} - X_k, \quad k \in I$$

the error vector at the kth subcarrier in-band. The formula for calculating the so-called error vector magnitude (EVM) varies depending on the communication standard (see "IEEE Standard for Local and Metropolitan Area Networks Part 16 . . . ", "Radio transmission and reception," *GSM Recommendation* 05.05, December 1999, and "Base station (BS) conformance testing (FDD)," 3*GPP TS* 25.141, v 3.14.0, pp. 1-109, May 2005, for instance). As an example, using the EVM metric defined in the WiMax standard, $$EVM\{\overline{x}_n^{(L)}\} = \frac{1}{S_{\max}} \sqrt{\frac{1}{N} \sum_{k \in I} |E_k|^2}, \quad (6)$$

where $S_{max}$ is the maximum amplitude of the constellation (see "IEEE Standard for Local and Metropolitan Area Networks Part 16 . . . "). In other words, EVM is a scaled root-mean-squared (rms) distance between the desired constellation points $X_k$ and positions of the signal $\overline{X}_k^{(L)}$, $k \in I$.

The EVM calculated according to equation (6) is only for one symbol period. However, in some OFDM standards the measured period may contain several OFDM symbols and the EVM is taken as the average. When N is large, the per symbol EVM will be very close to the average EVM over several symbols according to the law of large numbers.

Recall that $\overline{x}_n^{(L)}$ is the result of simple clipping. Suppose that $\tilde{x}_n^{(L)}$ is the signal that actually gets transmitted, which may be obtained after certain operations on $\overline{x}_n^{(L)}$. The standard usually specifies a threshold Th for the EVM and a spectral mask $P(\omega)$ for the power spectral density (PSD) of the transmitted signal $\tilde{x}_n^{(L)}$. It would be desirable to obtain $\tilde{x}_n^{(L)}$, or equivalently, $\tilde{X}_k^{(L)}$, such that:
(i) $PAR\{\tilde{x}_n^{(L)}\} << PAR\{x_n^{(L)}\}$;
(ii) $EVM\{\tilde{x}_n^{(L)}\} \leq Th$;
(iii) $PSD\{\tilde{x}_n^{(L)}\} \leq P(\omega)$, for $$\frac{\pi}{L} < |\omega| < \pi.$$

In calculating $EVM\{\tilde{x}_n^{(L)}\}$, replace the $E_k$ in equation (6) by $$\tilde{E}_k = \tilde{X}_k^{(L)} - X_k, k \in I. \quad (7)$$

One well-known method to contain the out-of-band spectral regrowth (i.e., objective (iii)) is to set $\tilde{X}_k^{(L)} = 0, \forall k \in O$; this is the so-called frequency domain filtering method proposed by J. Armstrong in "New OFDM peak-to-average power reduction scheme," *Proc. IEEE VTS 53rd Vehicular Technology Conference*. vol. 1, pp. 756-760, May 2001. With the Armstrong method, nothing is done to control the in-band EVM (i.e., objective (ii)). The out-of-band spectral regrowth stays far below the spectrum mask ($0 << P(\omega)$), which essentially wastes energy that is allotted by the standard that could be used for CFR (i.e., objective (i)). After filtering, the PAR is always larger than that of the simple clipping method; i.e., $PAR\{\tilde{x}_n^{(L)}\} > PAR\{\overline{x}_n^{(L)}\}$.

It would be desirable to improve upon Armstrong's work by incorporating the EVM constraint and by being more efficient with out-of-band energy allocation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
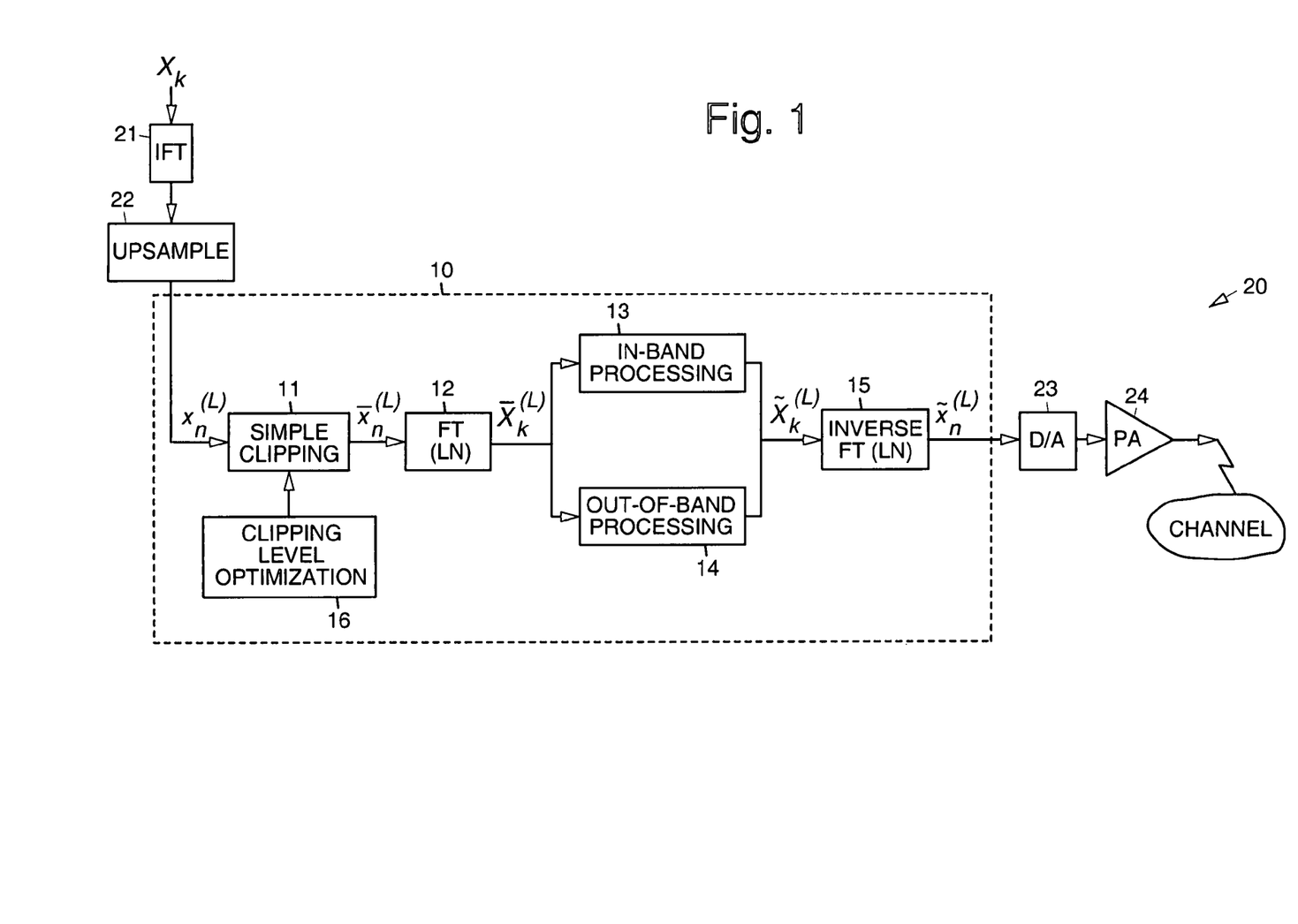
FIG. 1 illustrates an exemplary constrained clipping algorithm or technique employed in an exemplary transmitter.

Referring to FIG. 1, disclosed herein are constrained clipping systems, methods, techniques and algorithms (collectively designated by reference numeral 10, FIG. 1) that may be used in a transmitter 20 for reducing the peak-to-average power ratio (PAR) or crest factor of a multicarrier communications signal, for example. The constrained clipping technique 10 expands on Armstrong's work mentioned above by incorporating the EVM constraint and by being more efficient with out-of-band energy allocation.

The constrained clipping algorithm or technique is a transmitter-side processing technique that does not impose any modification at the receiver. Specifically, constrained clipping achieves PAR reduction while simultaneously satisfying spectral mask and error vector magnitude (EVM) constraints that are specified by most modern communications standards. The constrained clipping method includes two independent processing units, one to satisfy the in-band EVM constraint and the other to satisfy the out-of-band spectral constraint. Achievable PAR reduction results vary depending on the particular standards' requirements, but it is shown that by using constrained clipping on a QPSK WiMax signal with 256 subcarriers, a 4.5 dB PAR reduction at the $10^{-2}$ complementary cumulative distribution function (CCDF) level can be obtained.

The constrained clipping algorithm or technique does not require receiver-side modification to the typical multicarrier communications system. By not requiring any receiver-side modification, it is possible, for instance, to implement the CFR algorithm at the base station of an existing mobile communications network without requiring modifications to individual handsets.

The constrained clipping algorithm or technique works in OFDM systems wherein both in-band and out-of-band distortion must be kept below certain specified values. For example, a case is discussed below wherein out-of-band distortion must not exceed a given spectral mask, which specifies the allowed amount of out-of-band radiation. In-band distortion is quantified with a metric referred to as an error vector magnitude (EVM); most standards specify an EVM threshold that the transmitted signal is not to exceed. One novel aspect of the constrained clipping algorithm is that it guarantees that EVM and spectral mask requirements are met for each transmitted symbol. Furthermore, the constrained clipping technique is not an iterative technique; thus its computational complexity is relatively low.

The transmitter 20 processes a frequency domain signal $X_k$ that is to be transmitted over a wireless channel. The frequency domain signal is processed by an inverse Fourier transform (IFT) unit 21, and is then upsampled 22. The upsampled signal is processed using the constrained clipping technique 10 or algorithm. This produces a signal having a reduced peak-to-average power ratio (PAR) or crest factor. This reduced PAR signal is converted to an analog signal using a digital-to-analog (D/A) converter 23. The analog signal output by the D/A converter 23 is input to a power amplifier (PA) 24 for transmission over the wireless channel. Details of the constrained clipping technique 10 or algorithm 10 will now be discussed in more detail.

In-Band and Out-of-Band Processing Algorithms

The overall structure of the constrained clipping algorithm 10 is shown in FIG. 1. Assume that an incoming signal $(x_n^{(L)})$ is a standard OFDM signal before any CFR has been applied. First, the OFDM signal $x_n^{(L)}$ simply clipped 11 at some optimized clipping level $A_{max}$ generated by a clipping level optimization procedure 16, for example, to create $\bar{x}_n^{(L)}$ as in equation (3). The optimized clipping level may be obtained off-line using the optimized clipping level optimization procedure 16 to determine the best $A_{max}$ for use in the simple clipping module 11. Next, the signal is transformed 12 to the frequency domain with an LN-point discrete Fourier transform (DFT) which outputs the signal $\bar{X}_k^{(L)}$ as in equation (4). Afterwards, separate in-band and out-of-band processing modules 13, 14 (or algorithms 13, 14) follow to generate $\tilde{X}_k^{(L)}$ from $\bar{X}_k^{(L)}$ to ensure that the EVM and spectral mask requirements are met. Finally, the outgoing low-PAR symbol, $\tilde{x}_n^{(L)}$ is created with an LN-point inverse DFT operation 15 (replace $X_k^{(L)}$ by $\tilde{X}_k^{(L)}$ and $x_n^{(L)}$ by $\tilde{x}_n^{(L)}$ in equation (2)). Details of the three components of the constrained clipping algorithm or technique: in-band processing, out-of-band processing and clipping level optimization, are discussed below.

A. In-Band Processing Algorithm 13

If clipping is so light that the EVM requirement is already met by the simple clipping signal; i.e., $EVM\{\bar{x}_n^{(L)}\} \leq Th$, then no in-band processing 13 is necessary and $\tilde{X}_k^{(L)} = \bar{X}_k^{(L)}$, $k \in I$. If, however, $EVM\{\bar{x}_n^{(L)}\} > Th$, the in-band processing algorithm 13 strives to obtain a $\tilde{x}_n^{(L)}$ whose EVM is below the threshold Th and whose PAR is at a low level.

One way to ensure that the EVM is met is to set $$\tilde{X}_k^{(L)} = X_k + E_k \frac{Th}{EVM\{\bar{x}_n^{(L)}\}}, \forall k \in I, \qquad (8)$$

i.e., scale down each $E_k$ to reduce the EVM in $\tilde{x}_n^{(L)}$. Substituting equation (8) into equation (7) and then into equation (6), it can be shown that the corresponding $EVM\{\tilde{x}_n^{(L)}\} = Th$. However, through extensive computer simulations, it has been found that excessive peak regrowth occurs in $\tilde{x}_n^{(L)}$ as the result of the above scaling operation. A sorting-based method may be used which can yield significantly better CFR performance.

In the in-band processing algorithm 13, $|E_k|$ is first sorted, calculated according to equation (5), in ascending order. If the rms average of the smallest M $|E_k|$ values is less than or equal to $Th \cdot S_{max}$, but the rms average of the smallest M+1 $|E_k|$ values is greater than $Th \cdot S_{max}$, the value M is recorded, the subcarrier indices k that correspond to the M smallest $|E_k|$ values in a set Q are collected. In other words, Q is the largest set such that $$\frac{1}{S_{max}} \sqrt{\frac{1}{M} \sum_{k \in Q} |E_k|^2} \leq Th. \qquad (9)$$

Assign $$\tilde{X}_k^{(L)} = \bar{X}_k^{(L)}, k \in Q \subseteq I. \qquad (10)$$

This implies that $$\frac{1}{S_{max}} \sqrt{\frac{1}{M} \sum_{k \in Q} |\tilde{E}_k|^2} \leq Th \qquad (11)$$

For $k \in I$ but $k \notin Q$; i.e., $k \in (I \backslash Q)$, the process of obtaining $\tilde{X}_k^{(L)}$ from $\bar{X}_k^{(L)}$ is explained next. If $$|\tilde{E}_k| = Th \cdot S_{max}, \forall k \in (I \backslash Q) \qquad (12)$$

it can be inferred from equations (11) and (12) that $$EVM\{\tilde{x}_n^{(L)}\} = \frac{1}{S_{max}} \sqrt{\frac{1}{N} \sum_{k \in Q} |\tilde{E}_k|^2 + \frac{1}{N} \sum_{k \in (I \backslash Q)} |\tilde{E}_k|^2}$$

$$\leq \frac{1}{S_{max}} \sqrt{\frac{M \cdot Th^2 \cdot S_{max}^2}{N} + \frac{(N-M) \cdot Th^2 \cdot S_{max}^2}{N}}$$

$$= Th.$$

Thus equation (12) ensures that the EVM requirement will be met. This means that the vector $\tilde{X}_k^{(L)}$ should end on the circle that is centered at $X_k$ and that has radius $Th \cdot S_{max}$.

The next consideration is the PAR. Since $\bar{x}_n^{(L)}$ has low PAR, if $\tilde{x}_n^{(L)}$ is made to closely resemble $\bar{x}_n^{(L)}$, the PAR of $\tilde{x}_n^{(L)}$ is likely to be low as well. Recalling Parseval's Theorem and equation (10), it can be inferred that $$\sum_{n=0}^{LN-1} |\tilde{x}_n^{(L)} - \overline{x}_n^{(L)}|^2 = \sum_{k \in (I \setminus Q)} |\tilde{X}_k^{(L)} - \overline{X}_k^{(L)}|^2 + \sum_{k \in O} |\tilde{X}_k^{(L)} - \overline{X}_k^{(L)}|^2.$$

Therefore, $|\tilde{X}_k^{(L)} - \overline{X}_k^{(L)}|$ should be made as small as possible to ensure a low PAR value in $\tilde{x}_n^{(L)}$. Considering this and equation (12), it may be concluded that $\tilde{X}_k^{(L)}$ should lie at the intersection of the circle and the line connecting vectors $X_k$ and $\overline{X}_k^{(L)}$. In other words, $$\tilde{X}_k^{(L)} = X_k + Th \cdot S_{max} \, e^{j \angle E_k}, \, k \in (I \setminus Q) \quad (13)$$

Figure 2:
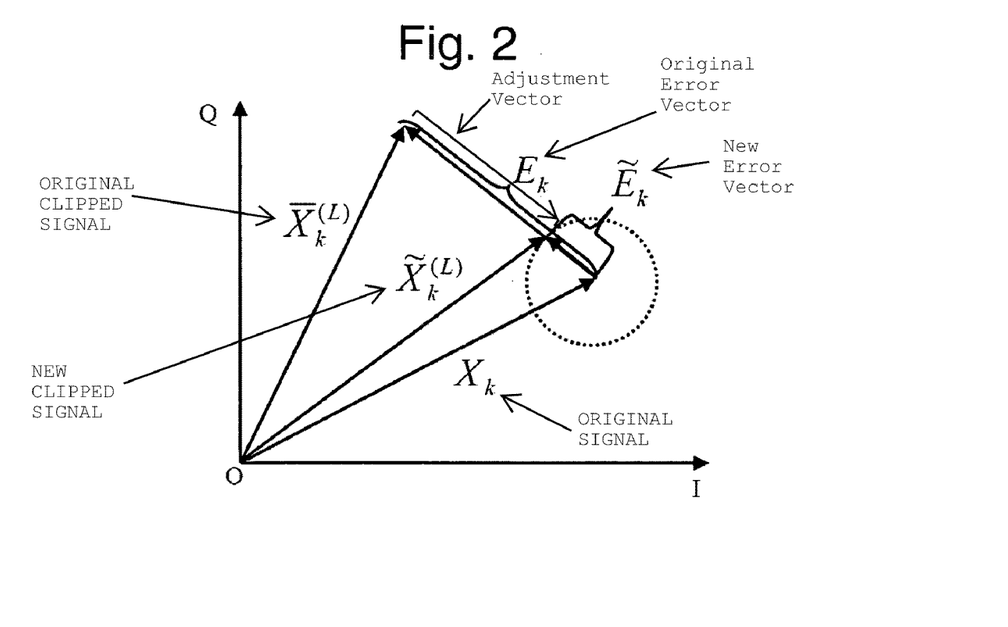
FIG. 2 is a vector diagram illustrating an exemplary in-band processing algorithm.

FIG. 2 is a vector diagram illustrating an exemplary in-band processing algorithm 13, with $k \in (I \setminus Q)$.

B. Out-of-Band Processing Algorithm 14

For the out-of-band algorithm 14, the concern is to meet a spectral mask requirement. The most commonly cited method involves filtering the baseband clipped signal with a low-pass filter as discussed by J. Armstrong, "Peak-to-average power reduction for OFDM by repeated clipping and frequency domain filtering," *IEE Electronics Letters*, vol. 38, issue 5, pp. 246-247, February 2002, X. Li and L. J. Cimini, "Effects of clipping and filtering on the performance of OFDM," *Proc. VTC'97*, pp. 1634-1638, May 1997, and H. L. Maattanen, N. Y. Ermolova and S. G. Haggman, "Nonlinear amplification of clipped-filtered multicarrier signals," *IEEE VTS 61st Vehicular Technology Conference*, vol. 2, pp. 958-962, May 2005. In filtering, the out-of-band $\overline{X}_k^{(L)}|^2$ values are scaled by various constants at each frequency bin k. Since $\overline{X}_k^{(L)}$ is random, the resulting filtered spectrum is random as well so it is difficult to ensure that the spectral mask requirement is always met. Moreover, filtering causes peak regrowth in $\tilde{x}_n^{(L)}$.

Denote by $P_k$ the spectral mask $P(\omega)$ sampled at $\omega = 2\pi k / (LN)$. The spectral clipping method 14 entails the following:

$$\tilde{X}_k^{(L)} = \begin{cases} \overline{X}_k^{(L)}, & |\overline{X}_k^{(L)}|^2 \le P_k, \, k \in O, \\ \sqrt{P_k} \, e^{j \angle \overline{X}_k^{(L)}}, & |\overline{X}_k^{(L)}|^2 > P_k, \, k \in O. \end{cases} \quad (14)$$

Note that equation (14) is a deterministic operation that is performed on the out-of-band frequency bins of each symbol $\overline{X}_k^{(L)}$; therefore, $PSD\{\tilde{x}_n^{(L)}\} \le P(\omega)$ can be guaranteed for each $\omega = 2\pi k/(LN)$, $k \in O$.

Spectral clipping resembles a method proposed by H. A. Suraweera, K. R. Panta, M. Feramez and J. Armstrong, "OFDM peak-to-average power reduction scheme with spectral masking," *Proc. Symposium on Communication Systems, Networks and Digital Signal Processing*, pp. 164-167, July 2004. However, the difference is that with spectral clipping, the out-of-band components that are clipped retain their pre-clipped phases. Similar to time-domain clipping, spectral clipping works by clipping in the frequency domain, the out-of-band parts of the signal that exceed the spectral mask back down to the spectral mask.

In summary, the in-band and out-of-band processing algorithms 13, 14 transform $\overline{X}_k^{(L)}$ into $\tilde{X}_k^{(L)}$ according to equations (10), (13) and (14). Finally, $\tilde{X}_k^{(L)}$ is transformed 15 back to the time-domain to yield the transmitted signal $\tilde{x}_n^{(L)}$. The PAR of $\tilde{x}_n^{(L)}$ is larger than that of $\tilde{x}_n^{(L)}$ but it is still much lower than the PAR of the original signal $x_n^{(L)}$.

C. Clipping Level Optimization 16

Based on empirical studies, it has been found that the PAR of $\tilde{x}_n^{(L)}$ has a complex relationship with the initial clipping level, $A_{max}$. If $A_{max}$ is set too low, then large peak regrowth occurs when generating $\tilde{x}_n^{(L)}$ from $\overline{x}_n^{(L)}$, but if $A_{max}$ is set too high then the output signal has a larger PAR than is necessary. Stated more precisely, the complementary cumulative distribution function (CCDF) of the final PAR is convex in the clipping level $A_{max}$. Naturally, it is desired to find the $A_{max}$ that minimizes the output PAR; but because the constrained clipping algorithm is very difficult to theoretically analyze the minimization is performed empirically.

Figure 3:
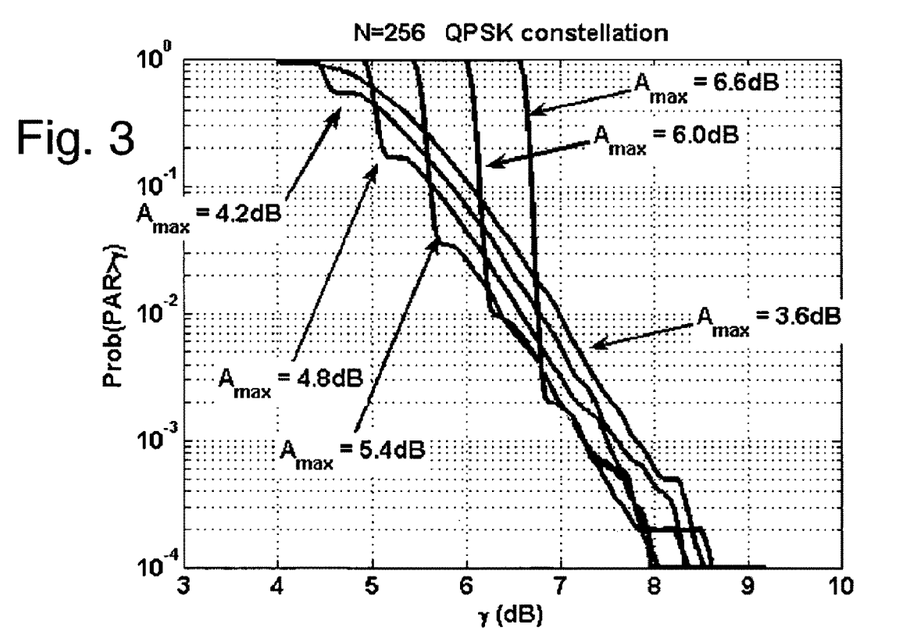
FIG. 3 is a complementary cumulative distribution function (CCDF) plot showing constrained clipping with different initial clipping levels $A_{max}$; the number of subcarriers N=256; the constrains are a WiMax spectral mask and the EVM threshold=6%.

To demonstrate this, CCDF curves are plotted for five different clipping levels in FIG. 3. In the plot, N=256, EVM threshold=6%, the constellation is QPSK and the spectral mask is taken from the 802.16 standard. Assume that the system calls for an output PAR of 6 dB. That is, any signal with a peak 6 dB above its mean will be clipped by the power amplifier, for instance. If an attempt is made to meet the output PAR of 6 dB by clipping at a low level of $A_{max}$=3.6 dB, then 10 percent of the processed symbols $\tilde{x}_n^{(L)}$ will have a PAR above 6 dB. However, if clipping is done at a moderate $A_{max}$=5.7 dB, then only about two percent of the processed symbols $\tilde{x}_n^{(L)}$ will exceed a PAR of 6 dB. Finally, if the clipping level is set to $A_{max}$=6.4 dB, it is observed from the plot that virtually every symbol will have an output PAR above 6 dB, which is very undesirable because all symbols with PAR above 6 dB are clipped.

Figure 4:
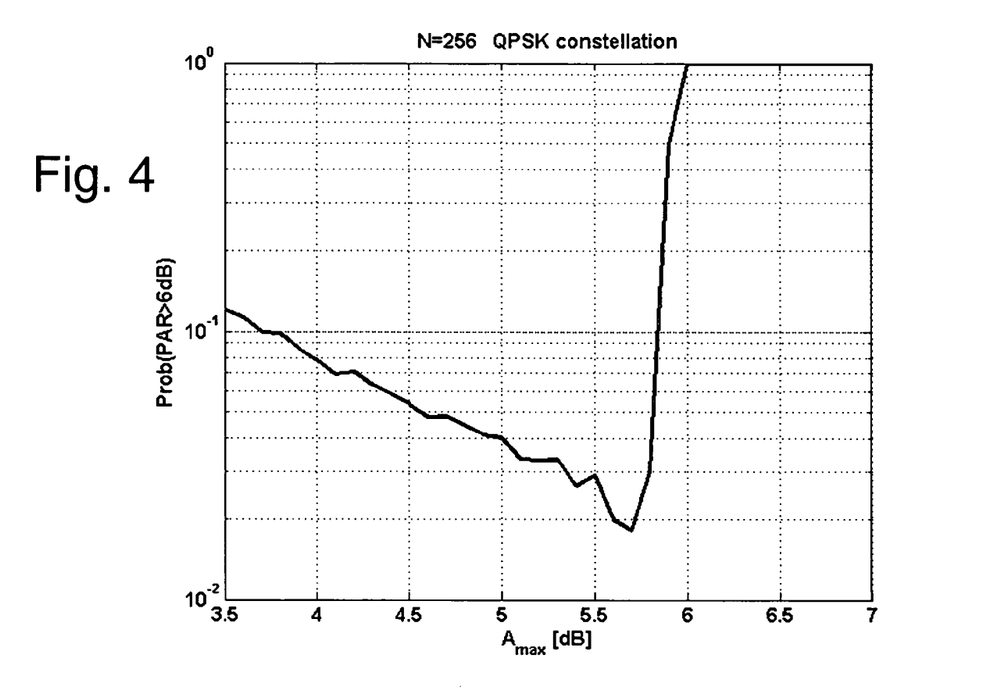
FIG. 4 is a plot showing the probability that an OFDM symbol will exceed 6 dB in PAR versus the initial clipping level $A_{max}$; the number of subcarriers N=256; the constrains are a WiMax spectral mask and EVM threshold=6%.

FIG. 4 is a plot of the probability that the final output PAR of $\tilde{x}_n^{(L)}$ is above 6 dB for different initial clipping levels $A_{max}$ for $x_n^{(L)}$. From FIG. 3, it may be determined that the optimal clipping level was 5.7 dB for this particular example. FIG. 4 confirms that the optimal clipping level is 5.7 dB, with about two percent of the output symbols having a PAR above 6 dB.

FIG. 4 illustrates that it is possible to select the clipping level $A_{max}$ so that the probability of the symbol PAR exceeding 6 dB is minimized. In order to create a PAR CCDF for the constrained clipping method, it is necessary to find the optimal $A_{max}$ for every possible output PAR. Accordingly, creating a CCDF via Monte Carlo runs requires a great deal of simulation time. However, in a practical system, the optimization only needs to be performed once, offline, for each set of system parameters (system parameters include the spectral mask, number of subcarriers, EVM threshold and the type of constellation). For each set of parameters, the offline optimization returns a clipping level $A_{max}$ that is used in the constrained clipping algorithm 10. Hence, while the off-line computational complexity for finding the best $A_{max}$ is high, the actual complexity of constrained clipping when implemented with the optimized $A_{max}$ is very low.

Figure 5:
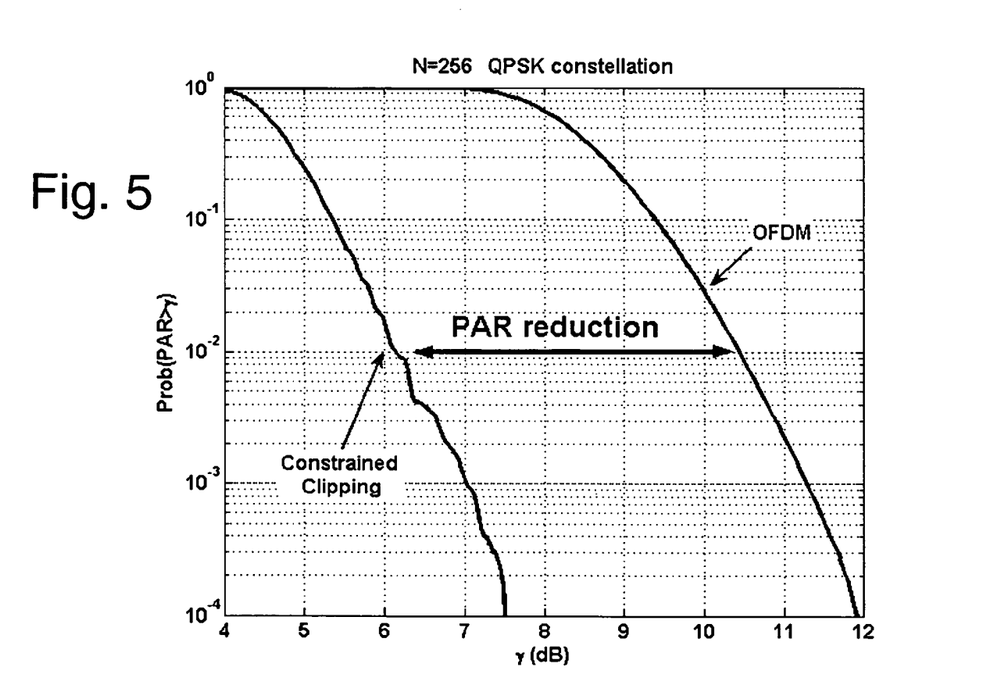
FIG. 5 is a CCDF plot showing constrained clipping after clipping level optimization; the number of subarriers N=256; the constraints are a WiMax spectral mask and EVM threshold=6%.

FIG. 5 is a plot of the CCDF of the constrained clipping method 10 after the initial clipping level $A_{max}$ has been optimized for every output PAR from 4 dB to 8 dB in increments of 0.1 dB. As can be seen, an impressive PAR reduction of close to 4.5 dB at the $10^{-2}$ CCDF level is possible while still meeting the spectral mask and EVM constraints. Simulations have shown that even larger PAR reduction results can be achieved for larger N values with the same EVM and spectral constraints.

Simulated Spectrum and EVM Characteristics

For simulation purposes the spectral mask from the 802.16 standard is used. Also, in all simulations the QPSK constellation was used; N=256 and EVM threshold=6%.

A. Spectral Characteristics

Figure 6:
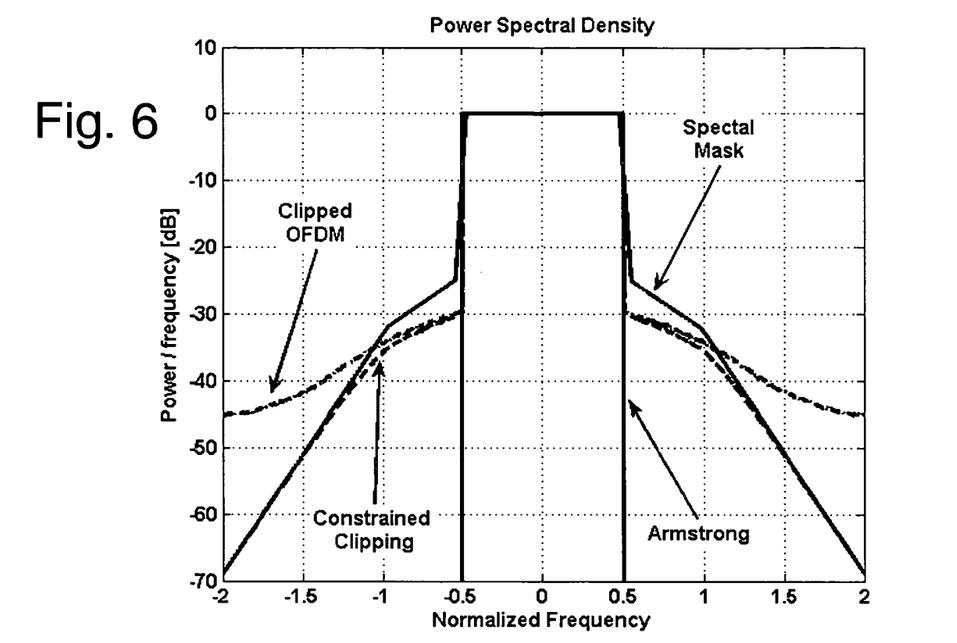
FIG. 6 illustrates power spectral densities from the simple clipping technique, Armstrong's technique, and an exemplary constrained clipping technique, along with an exemplary spectral mask.

Ideally, an OFDM symbol after being processed by the constrained clipping algorithm 10 will meet the spectrum mask exactly. This is in contrast to the method presented by J. Armstrong, "New OFDM peak-to-average power reduction scheme," *Proc. IEEE VTS 53rd Vehicular Technology Conference*. vol. 1, pp. 756-760, May 2001, where all of the out-of-band subcarriers are set to zero. FIG. 6 is a simulated PSD plot of the constrained clipping algorithm, Armstrong's algorithm, the spectral mask, and the PSD of the signal after simple clipping. For the plot N=256, EVM threshold=6%, $A_{max}$=5.7 dB, and the constellation is QPSK. In the plot it can be seen that the spectrum of the signal processed by the constrained clipping algorithm 10 closely follows that of the simple clipping signal for frequencies where the latter does not exceed the spectral mask. For frequencies where the spectrum of the simple clipping signal does exceed the spectral mask, the spectrum of the signal processed by the constrained clipping algorithm 10 closely follows the spectral mask. This is to be expected since the signal was intentionally clipped in the frequency domain to exactly meet the spectral mask.

B. EVM Characteristics

Figure 7:
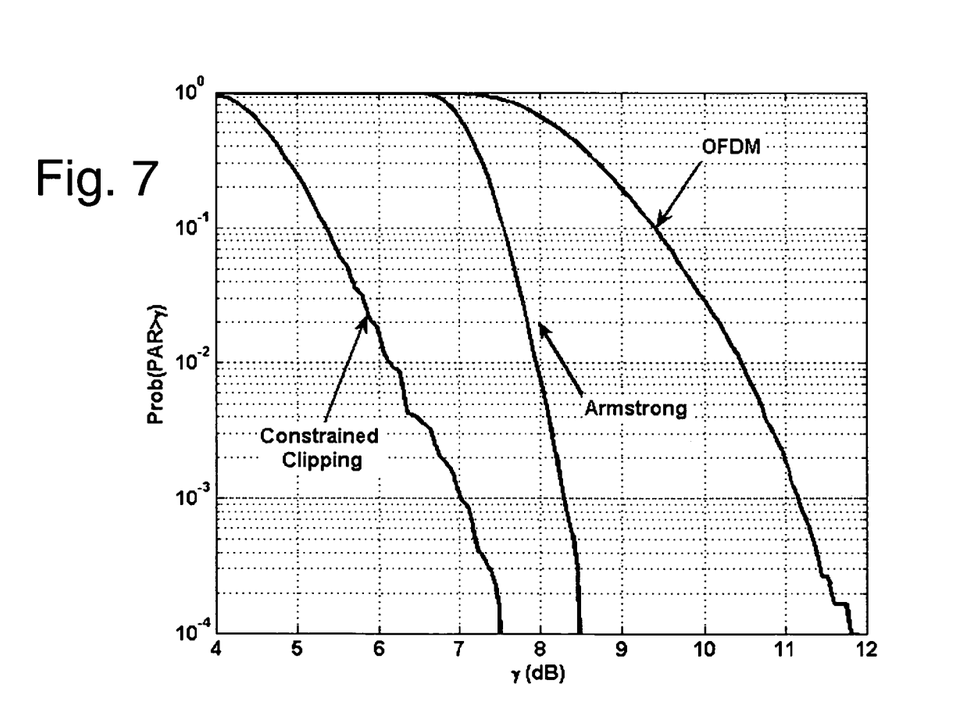
FIG. 7 illustrates a CCDF comparison between Armstrong's technique and the exemplary constrained clipping technique.

The EVM of the constrained clipping algorithm 10 is designed to never exceed the specified maximum EVM, so it is difficult to compare the constrained clipping method 10 with a CFR method such as Armstrong's that does not take EVM into account. In order to compare the CFR capability of Armstrong's method to the constrained clipping algorithm 10, it was necessary to accept a certain probability of EVM-threshold violation from Armstrong's method. In FIG. 7, the CCDF of the constrained clipping method 10 is plotted along with the CCDF of Armstrong's method. For the plot, a clipping level of 5.7 dB was chosen for Armstrong's method. At this clipping level, symbols processed by Armstrong's method exceed the EVM threshold about 1.5% of the time, whereas symbols processed by the constrained clipping method 10 are guaranteed to never exceed the threshold. Despite this handicap, the constrained clipping method 10 still significantly outperforms Armstrong's method in CFR capability.

Thus, a constrained clipping technique 10 has been disclosed which is a CFR method or technique that drastically reduces the PAR while satisfying any given EVM and spectral mask constraints. Constrained clipping accomplishes these guarantees by using separate operations for the in-band and out-of-band portions of the signal. With the in-band processing algorithm 13, the largest error vectors are modified to achieve the desired EVM. In the out-of band processing algorithm 14, spectral clipping is implemented where the out-of-band signal frequencies that contain more energy than is allowed by the mask are "clipped" down to the mask level. Through extensive simulations it has been shown that even for tight EVM and spectral constraints, PAR reductions of some 4.5 dB can be achieved for an OFDM signal with 256 subcarriers. The distinct advantage of the constrained clipping algorithm is that all processing is done at the transmitter side so no receiver-side modification is necessary.

Thus, constrained clipping apparatus, methods, techniques and algorithms have been disclosed that provide for constrained clipping for crest factor (peak-to-average power ratio) reduction in multicarrier communications systems. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Signal transmission apparatus, comprising:
   a clipping module for clipping a multicarrier time-domain signal at a predetermined clipping level to produce a clipped multicarrier signal;
   a transforming module for Fourier transforming the clipped multicarrier signal into a frequency domain to produce a frequency domain clipped multicarrier signal;
   an in-band processing module for processing the frequency domain clipped multicarrier signal to produce a signal whose error vector magnitude is below a predetermined threshold and whose peak-to-average power ratio (PAR) is at a level lower than the PAR level of the multicarrier time-domain signal;
   an out-of-band processing module for processing the frequency domain clipped multicarrier signal to satisfy an out-of-band spectral power mask;
   an inverse transforming module for inverse Fourier transforming a combined in-band and out-of-band processed signal to produce a low-PAR time-domain signal;
   wherein the in-band module adds an adjustment vector to the frequency domain clipped multicarrier signal so that the error vector magnitude is reduced; and
   wherein a sorting algorithm is applied to determine a set of in-band error vectors that are to be modified.

2. The apparatus recited in claim 1, wherein the frequency domain signal after the in-band processing is obtained by modifying the smallest set of in-band error vectors to meet a desired threshold.

3. The apparatus recited in claim 1, wherein the out-of-band module spectrally clips the out-of-band components of the frequency domain clipped multicarrier signal.

4. The apparatus recited in claim 1, wherein the out-of-band portion of the frequency domain clipped multicarrier signal is obtained by setting the power of each out-of-band subcarrier that exceeds a given threshold power to the threshold power.

5. The apparatus recited in claim 1, wherein the out-of-band portion of the frequency domain clipped multicarrier signal is obtained by setting the power of each out-of-band subcarrier that exceeds a given threshold power to the threshold power while retaining the subcarrier phase.

6. A method comprising:
   clipping a multicarrier time-domain signal at a predetermined clipping level to produce a clipped multicarrier signal;
   Fourier transforming the clipped multicarrier signal into the frequency domain to produce a frequency domain clipped multicarrier signal;
   in-band processing the frequency domain clipped multicarrier signal to produce a signal whose error vector magnitude is below a predetermined threshold and whose peak-to-average power ratio (PAR) is at a level lower than the PAR of the multicarrier time-domain signal;
   out-of-band processing the frequency domain clipped multicarrier signal to satisfy an out-of-band spectral power mask;
   inverse Fourier transforming a combined in-band and out-of-band processed signal to produce a low-PAR time-domain signal;
   wherein the in-band processing includes adding an adjustment vector to the frequency domain clipped multicarrier signal so that the error vector magnitude is reduced; and
   wherein a sorting algorithm is applied to determine a set of in-band error vectors that are to be modified.

7. The method recited in claim 6, wherein the frequency domain signal after the in-band processing is obtained by modifying the smallest set of in-band error vectors to meet a desired threshold.

8. The method recited in claim 6, wherein the out-of-band processing includes clipping the out-of-band components of the frequency domain clipped multicarrier signal.

9. The method recited in claim 6, wherein the out-of-band portion of the frequency domain clipped multicarrier signal is obtained by setting the power of each out-of-band subcarrier that exceeds a given threshold power to the threshold power.

10. The method recited in claim 6, wherein the out-of-band portion of the frequency domain clipped multicarrier signal is obtained by setting the power of each out-of-band subcarrier that exceeds a given threshold power to the threshold power while retaining the subcarrier phase.

* * * * *